Patented Oct. 19, 1948

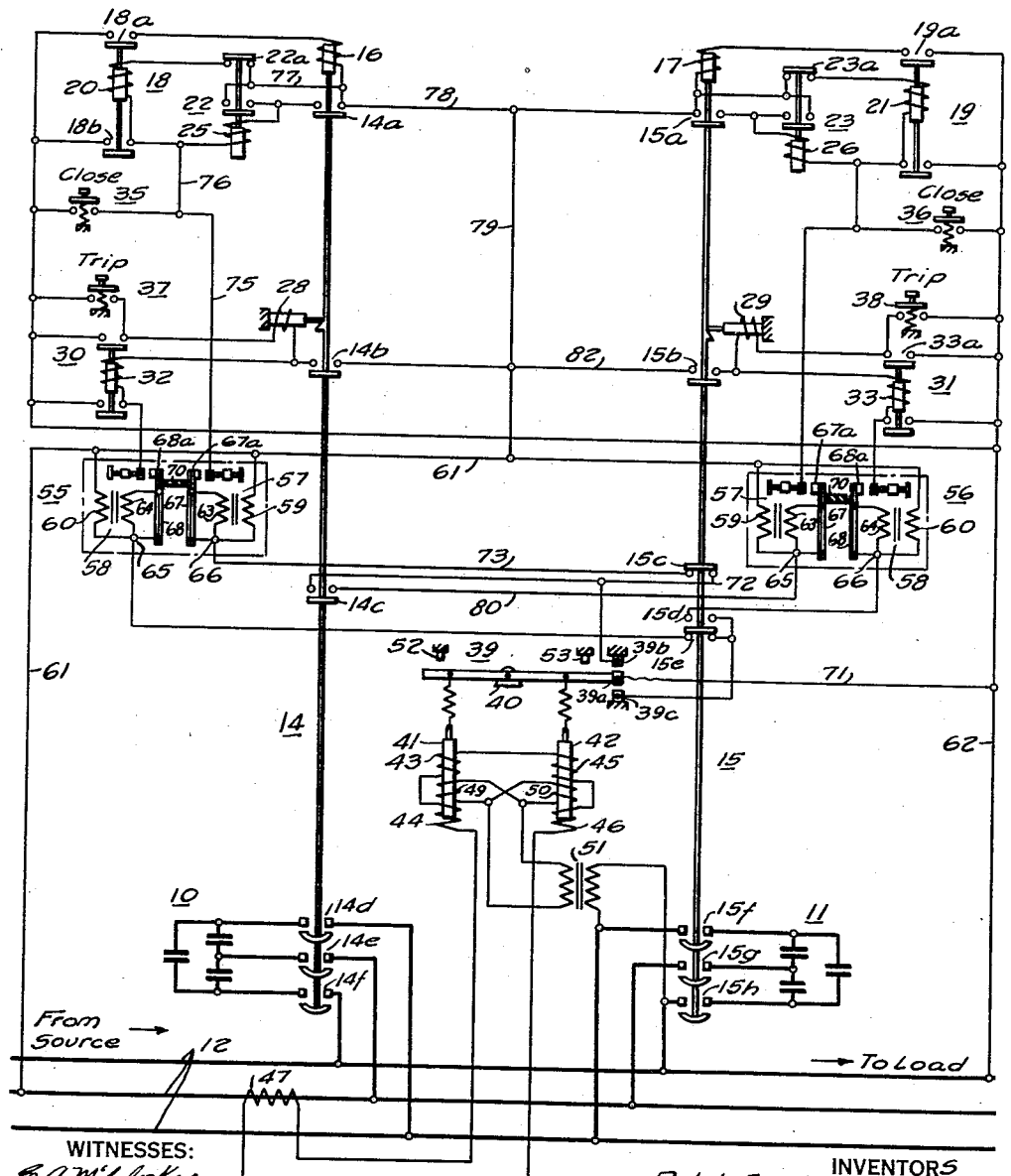

2,451,939

UNITED STATES PATENT OFFICE 2,451,939

AUTOMATIC SWITCHING SYSTEM

Ralph A. Geiselman and William H. Cuttino, Wilkinsburg, Pa., assignors to Westinghouse Electric Corporation, East Pittsburgh, Pa., a corporation of Pennsylvania Application April 27, 1944, Serial No. 533,097

5 Claims. (Cl. 175—375)

Our invention relates, generally, to automatic switching systems and has reference, in particular, to systems for automatically switching capacitors in power systems.

Generally stated, it is an object of our invention to provide a capacitor switching system that is simple and inexpensive to manufacture and is positive and reliable in operation.

More specifically, it is an object of our invention to provide for switching capacitors in and out of a power system in accordance with the reactive kilovolt-amperes in the system in order to regulate the voltage and power factor of the system.

It is also an object of our invention to provide an automatic switching system which is positive and definite in operation for controlling the connections of capacitors to a power system.

Still another object of our invention is to provide for switching capacitors in a power system under the control of a relay which is responsive to the amount of reactive kilovolt-amperes in the system and which operates positively and definitely after the reactive kilovolt-amperes exceed a predetermined threshold value.

Yet another object of our invention is to provide a simple and effective control system for switching capacitors in a power system under the control of a reactive kilovolt-ampere relay having magnetic restraining means which provides a positive restraining force until the reactive kilovolt-amperes of the system exceed a predetermined threshold value and then permits positive and definite action of the relay to effect changes in the connections of the capacitors.

Other objects will in part be obvious, and will in part be explained hereinafter.

In accordance with one embodiment of our invention the operations of the circuit breaker control relays for the circuit breakers which connect the capacitors to and disconnect them from the power system are controlled by a control device which is responsive to the reactive kilovolt-amperes of the system. The operation of the device is made positive and definite by using magnetic restraining means to maintain the device in the inoperative position until the reactive kilovolt-amperes of the system exceed a predetermined value whereupon the restraining force of the magnetic means is no longer effective to prevent operation of the device.

For a more complete understanding of the nature and scope of our invention reference may be made to the following detailed description which may be read in connection with the accompanying drawing, in which the single figure is a diagrammatic view of an automatic switching system embodying the invention in one of its forms.

Referring to the single figure of the drawing, the reference numerals 10 and 11 may denote, generally, banks of capacitors which are to be connected to and disconnected from a polyphase power system supplying electrical energy to a load, and which may be represented by the conductors 12, by means of circuit breakers 14 and 15 having operating windings 16 and 17, respectively.

Operation of the circuit breakers 14 and 15 may be effected in the usual manner by means of circuit breaker control relays such as closing relays 18 and 19 having operating windings 20 and 21, and cut-off relays 22 and 23 having operating windings 25 and 26, respectively. The circuit breakers may be retained in the closed position by suitable latch means released by trip means 28 and 29 under the control of trip relays 30 and 31 having operating windings 32 and 33, respectively. Suitable manual control means may be provided for closing and tripping the circuit breakers such as the "close" pushbutton switches 35 and 36, and the "trip" pushbutton switches 37 and 38.

In order to connect the capacitors 10 and 11 to the conductors 12 when the reactive kilovolt-amperes of the power system become sufficiently lagging, and to disconnect them therefrom when the reactive kilovolt-amperes become leading, control means in the form of a reactive kilovolt-ampere device 39 may be utilized. The device may comprise a movable contact arm 39a pivotally mounted on a suitable support 40 for engaging one or another of a pair of stationary contact members 39b and 39c. Operation of the contact arm 39a may be effected by armatures 41 and 42 provided with opposed current windings 43, 44 and 45, 46, which may be energized from a current transformer 47 in accordance with the current in one of the conductors of the power system. Voltage windings 49 and 50 may be provided in conjunction with the current windings and disposed to be energized from a control transformer 51 in accordance with the voltage between the other two conductors of the polyphase power system.

Accordingly, the magnetomotive forces of the operating windings may be balanced so as to provide zero torque on the contact arm 39a at unity power factor when the reactive kilovolt-amperes in the system are at a minimum. The contact arm 39a may, therefore, be actuated to engage the contact member 39b and effect closure of one or both of the circuit breakers when the reactive kilovolt-amperes of the system become lagging, and may be actuated in the opposite direction to engage the contact member 39c to trip one or both of the circuit breakers when the reactive kilovolt-amperes become sufficiently leading.

Positive operation of the moving contact arm 39a to obtain quick "make" and "break" of the contact members may be obtained by utilizing accelerating means such as the permanent magnets 52 and 53 which may provide opposed pulls on the arm 39a which vary inversely as the arm moves in one direction or the other from the intermediate position, and are substantially balanced while it is in the intermediate or inoperative position. As soon as the reactive kilovolt-amperes of the system reach a predetermined threshold value the torque applied to the contact arm 39a moves the arm. When the airgaps between the magnets and the contact arm 39a change, one is increased and the other is decreased, so that pull of the magnet from which the arm is moving away is reduced abruptly and the magnetic pull of the other magnet on the arm is increased, so that the contact arm 39a moves quickly and positively under the torque developed by the operating windings to engage one or another of the stationary contact members. Only by having such a positive and definite contact arm action is it possible to provide adequate control for the circuit breakers for switching the capacitors in accordance with reactive kilovolt-ampere conditions of the system. The usual type of induction relay is not suitable for such control without requiring the use of expensive and complicated auxiliary control equipment.

In order to prevent hunting of the control system due to momentary changes or fluctuations in the reactive kilovolt-amperes of the system, time delay means such as the thermal time delay devices 55 and 56 may be utilized for providing a predetermined time delay between the operation of the reactive kilovolt-ampere device 39 and the operation of the circuit breaker control relays.

The time delay devices may, for example, each comprise control transformers 57 and 58 having primary windings 59 and 60 disposed to be connected to a suitable source of alternating current represented by the conductors 61 and 62 through the contact members of the reactive kilovolt-ampere device.

The control transformers may be provided with secondary windings 63 and 64 connected to the primary windings at the terminal points 65 and 66 and connected to bimetallic thermally responsive elements 67 and 68 which may be disposed to operate movable contact members 67a and 68a to complete circuits for the trip means and closing relays of the circuit breakers 14 and 15 respectively.

In order to provide for operation of the circuit breakers 14 and 15 in predetermined sequence the energizing circuits for the time delay means may be completed through auxiliary contact members of the circuit breakers so that the circuit breaker 15 may not be closed until the circuit breaker 14 is closed. Likewise, by connecting auxiliary contact members of the circuit breakers in the operating circuits of the trip relays 38 and 31, the circuit breaker 15 may be tripped before the circuit breaker 14.

Corrections for changes in ambient temperatures and positive interlocking between the thermal elements of the time delay means may be effected by operatively connecting the elements 67 and 68 by insulating means 70 with the elements arranged in opposed operating relation.

With the whole system in the deenergized position, the elements will be in the position as shown. When the conductors 12 are energized the arm 39a of the reactive kilovolt-ampere device 39 will operate to engage contact members 39b whenever the kilovolt-amperes in the system become sufficiently lagging. This establishes an energizing circuit for the primary winding 59 of the control transformer 57 of the time delay means 55 extending from the control conductor 62, through conductor 71, contact arm 39a, contact member 39b, conductor 72, contact members 15c, conductor 73, primary winding 59 to conductor 61.

The thermal elements 67 is thereby energized and after a predetermined time closes contact members 67a thereby providing an energizing circuit for the operating winding 20 of the closing relay 18. This circuit extends from conductor 62 through conductor 71, contact arm 39a, contact member 39b, conductor 72, contact member 15c, conductor 73, secondary winding 63 and thermal element 67, contact members 67a, conductor 75, conductor 76, operating winding 20, contact members 22a, conductor 77, conductor 78 and conductor 79 to the control conductor 61. The relay 18 operates, closing contact members 18a to provide an energizing circuit for the operating winding 16 of the circuit breaker 14, and closing contact members 18b to provide a holding circuit to control conductor 62. Closure of the circuit breaker 14 connects the capacitors 10 to the conductors 12 through contact members 14d, 14e and 14f, thereby neutralizing at least in part the reactive kilovolt-amperes of the power system. Auxiliary contact members 14a provide an energizing circuit for the operating winding 25 of the cutoff relay 22 which operates to deenergize the operating winding 16 of the circuit breaker by opening contact members 22a and deenergizing the operating winding 20 of the closing relay 18. The device 39 may now operate to disconnect the capacitors 10 or connect the capacitors 11, depending on circuit condition.

If the connection of the capacitors 10 should not provide sufficient capacitance to correct the lagging condition of the power system, the reactive kilovolt-ampere device 39 will remain in the operated position with the contact arm 39a engaging the stationary contact member 39b. Accordingly, an energizing circuit is provided for the primary winding 59 of the time delay device 56 extending from the control conductor 62 through contact arm 39a, contact members 39b, conductor 72, auxiliary contact members 14c, conductor 80, primary winding 59 to control conductor 61.

After a predetermined time the bimetallic element 67 operates, closing contact members 67a. An energizing circuit is thereby completed for the operating winding 21 of the closing relay 19. Operation of the closing relay 19 effects energization of the operating winding 17 of the circuit breaker 15 through contact members 19a, so that the circuit breaker 15 closes. The capacitors 11 are thereby connected to the power system through contact members 15f, 15g and 15h to further assist in neutralizing the lagging reactive kilovolt-amperes of the power system. Contact members 15a provide an energizing circuit for the operating winding 26 of the cutoff relay which opens contact members 23a to deenergize the operating winding 21 of the closing relay. The operating winding 17 of the circuit breaker 15 is thereby deenergized.

Should the condition of the power system change subsequently so that the reactive kilovolt-amperes become leading, the contact arm 39a of the reactive kilovolt-ampere device 39 will be actuated in the opposite direction to engage the stationary contact member 39c. An energizing circuit is provided for the primary winding 60 of the time delay device 56 extending from the control conductor 62 through conductor 71, contact arm 39a, contact member 39c, contact members 15d, primary winding 60 to control conductor 61.

After a predetermined time delay the thermal element 68 operates, closing contact members 68a and providing an energizing circuit for the operating winding 33 of the trip relay 31. This circuit extends from the control conductor 62 through conductor 71, contact arm 39a, contact member 39c, contact members 15d, secondary winding 64 and thermal element 68, contact members 68a, operating winding 33, auxiliary contact members 15b, conductor 82, and conductor 79 to the other control conductor 61. Operation of the trip relay 31 completes an energizing circuit for the trip means 29 through contact members 33a and 15b so that the trip means operates and effects opening of the circuit breaker 15.

Should the disconnection of the capacitors 11 from the power system correct the leading reactive kilovolt-ampere condition, the contact arm 39a of the reactive kilovolt-ampere device 39 will return to the intermediate or neutral position and the capacitors 10 will remain connected to the system. In this condition the reactive kilovolt-ampere device is ready to either reconnect the capacitors 11 to the power system in the event that the reactive kilovolt-amperes of the system should become lagging, since the auxiliary contact members 14c of the circuit breaker 14 are closed and permit completion of the energizing circuit for the thermal element 67 of the time delay means 56, or disconnect the capacitors 10 from the system in the event that the reactive kilovolt-amperes should become sufficiently leading, since the auxiliary contact members 15e of the circuit breaker are closed to permit the completion of the energizing circuit for the thermal element 68 of the time delay 55, and contact members 14b in the trip circuit are closed.

From the above description and the accompanying drawing it will be realized that we have provided a simple and effective switching system for controlling the connection and disconnection of capacitors to and from a power system in accordance with the reactive kilovolt-ampere condition of the system. By utilizing a reactive kilovolt-ampere device having a positive operating action whenever the reactive kilovolt-amperes exceed a predetermined threshold value, it is possible to greatly simplify the control system since the energizing circuits for the circuit breaker control means may be controlled directly by the reactive kilovolt-ampere device. Such simplification of the system is not possible with the usual induction type of reactive kilovolt-ampere relay which is not definite or positive in its closing action.

Since certain changes may be made in the above described construction and different embodiments of the invention may be made without departing from the spirit and scope thereof, it is intended that all the matter contained in the above description or shown in the accompanying drawing shall be considered as illustrative and not in a limiting sense.

We claim as our invention:

1. A control system for a circuit breaker controlling the connection of a capacitor to a power system comprising, relay means operable to control the operation of the circuit breaker, control means having a movable contact member with magnetic accelerating means operable to provide quick make and break operation and a plurality of current and voltage operating windings energized from the system for actuating the contact member in different senses depending on whether the reactive kilovolt-amperes are leading or lagging, and time delay means selectively operable in response to operation of the control means a predetermined time after operation of the control means to effect operation of the relay means to open or close the circuit breaker.

2. In a control system for a plurality of devices, in combination, a circuit breaker for each device, relay means controlling each of the circuit breakers, time delay means of the thermal type for each circuit breaker selectively operable to effect operation of the relay means associated with each circuit breaker, control means having contact means with a variable magnetic circuit for providing quick make and break operation and having current and voltage windings energized from the system operable in accordance with the reactive energy of the system to selectively effect operation of the contact means for controlling the time delay means, and circuit means including auxiliary contact means operable in response to operations of the circuit breakers for effecting operation of the relay means of the circuit breakers in predetermined sequences.

3. In a switching system for a plurality of devices, in combination, a circuit breaker for controlling the connection of each device to a power system, closing means operable to effect closure of each circuit breaker, trip means operable to open each circuit breaker, a time delay device of the thermal type for each of the closing and trip means operable after being energized for a predetermined time to effect operation of the means with which it is associated, control means comprising contact means selectively operable to provide operating circuits for the time delay devices of either the closing or trip means only after the reactive energy of the system reaches a predetermined minimum value either lagging or leading, said contact means being provided with opposed permanent magnet control means for effecting relatively quick operation of the contact means in making and breaking of the operating circuits, and circuit means including auxiliary contact members of the circuit breakers connected in the operating circuits of the time delay devices to provide for closing and opening of the circuit breakers in predetermined sequential relation.

4. A switching system for capacitor means disposed to be connected to and disconnected from a power system comprising, closing means, trip means, a circuit breaker operable under the control of the closing and trip means to connect the capacitor means to and disconnect it from the system, control means including a pivoted contact arm of magnetic material having opposed stationary permanent magnet means for providing quick make and break action, said means being responsive to predetermined power factor conditions to close one or another of a pair of contact members, and a pair of time delay devices having primary windings disposed to be energized through one or another of said contact members and secondary windings for effecting operation of opposed bimetallic switch elements connected in series circuit relation with one or another of the contact members and the closing or trip means.

5. An automatic switching system for a plurality of capacitor means disposed to be connected to a power system by circuit breakers comprising, a closing relay for each circuit breaker, trip means for each circuit breaker, time delay means for each of the closing relays and trip means comprising a transformer having a primary winding disposed to be connected to a source of alternating current and a secondary winding connected at one end to the primary winding and having a bimetallic thermal element connected thereacross with normally open contact members connected between the other end and one of the closing relays or trip means, and means controlling the operation of the time delay means comprising a reactive energy relay having normally open contact members in series circuit relation with the primary and secondary windings of the closing relay and trip means, time delay means, and a movable member normally retained in an intermediate position and having a portion of magnetic material with permanent magnet means arranged to provide a maximum attractive force in the closed position of one or the other of the contact members and operable to close one or another of the contact members relatively quickly in accordance with the energization of a plurality of operating windings energized in accordance with the current in one conductor of the system and the voltage between the other conductors thereof.

RALPH A. GEISELMAN.
WILLIAM H. CUTTINO.

REFERENCES CITED

The following references are of record in the file of this patent:

UNITED STATES PATENTS

| Number | Name | Date |
|---|---|---|
| 1,701,351 | Anderson | Feb. 5, 1929 |
| 1,738,344 | Anderson | Dec. 3, 1929 |
| 1,962,943 | Seeley | June 12, 1934 |
| 2,298,026 | Bany | Oct. 6, 1942 |